United States Patent
Hall et al.

(10) Patent No.: US 10,410,462 B2
(45) Date of Patent: Sep. 10, 2019

(54) EXCHANGEABLE ELECTRIC VEHICLE BATTERY RECEPTACLE, KIOSK, AND INFRASTRUCTURE

(71) Applicants: David R. Hall, Provo, UT (US);
Stephen R. Hall, Draper, UT (US);
Christopher Johnson, Provo, UT (US);
Jason Simpson, Provo, UT (US)

(72) Inventors: David R. Hall, Provo, UT (US);
Stephen R. Hall, Draper, UT (US);
Christopher Johnson, Provo, UT (US);
Jason Simpson, Provo, UT (US)

( * ) Notice: Subject to any disclaimer, the term of this patent is extended or adjusted under 35 U.S.C. 154(b) by 368 days.

(21) Appl. No.: 15/220,890

(22) Filed: Jul. 27, 2016

(65) Prior Publication Data
US 2018/0029496 A1 Feb. 1, 2018

(51) Int. Cl.
| | |
|---|---|
| *H01M 2/10* | (2006.01) |
| *B60L 11/18* | (2006.01) |
| *G07F 17/00* | (2006.01) |
| *B60L 50/64* | (2019.01) |
| *H01M 10/42* | (2006.01) |
| *H01M 10/48* | (2006.01) |

(52) U.S. Cl.
CPC .......... *G07F 17/0014* (2013.01); *B60L 50/64* (2019.02); *H01M 2/1077* (2013.01); *H01M 2/1005* (2013.01); *H01M 10/4221* (2013.01); *H01M 10/488* (2013.01); *H01M 2220/20* (2013.01); *Y02T 90/124* (2013.01)

(58) Field of Classification Search
CPC .......................... H01M 2/1072; B60L 11/1879
See application file for complete search history.

(56) References Cited

FOREIGN PATENT DOCUMENTS

JP 2001-015090 * 1/2001 ............. H01M 2/10

* cited by examiner

*Primary Examiner* — Osei K Amponsah (57) ABSTRACT

An exchangeable electric vehicle battery receptacle, kiosk is disclosed herein. The kiosk includes a receptacle, a bell crank and solenoid that lock a battery in the receptacle, and circuitry that dispenses the battery. The bell crank includes a first arm extending into the receptacle and a second arm coupled to an extension spring that is coupled to a fixed point on the kiosk. The battery includes a form factor dimensioned to fit at least partially around the first arm. The solenoid has an armature and is positioned adjacent to the second arm. The armature fixes the bell crank and fixes the extension spring in an extended state, thereby locking the battery in the receptacle slot. The circuitry retracts the armature into the solenoid. A retraction force on the second arm by the extension spring rotates the bell crank, at least partially dispensing the exchangeable battery from the receptacle slot.

14 Claims, 7 Drawing Sheets

EXCHANGEABLE ELECTRIC VEHICLE BATTERY RECEPTACLE, KIOSK, AND INFRASTRUCTURE

TECHNICAL FIELD

The present invention relates to systems and methods that enable operators of electric vehicles (EV) to extend their range by utilizing exchangeable charging batteries.

BACKGROUND

Electric vehicles have been utilized for transportation purposes and recreational purposes for quite some time. Electric vehicles require a battery that powers an electric motor, and in turn propels the vehicle in the desired location. The drawback with electric vehicles is that the range provided by batteries is limited, and the infrastructure available to users of electric vehicles is substantially reduced compared to fossil fuel vehicles. For instance, fossil fuel vehicles that utilize gasoline and diesel to operate piston driven motors represent a majority of all vehicles utilized by people around the world. Consequently, fueling stations are commonplace and well distributed throughout areas of transportation, providing for easy refueling at any time. For this reason, fossil fuel vehicles are generally considered to have unlimited range, provided users refuel before their vehicles reach empty.

On the other hand, owners of electric vehicles must carefully plan their driving routes and trips around available recharging stations. For this reason, many electric vehicles on the road today are partially electric and partially fossil fuel burning. For those vehicles that are pure electric, owners usually rely on charging stations at their private residences, or specialty recharging stations. However specialty recharging stations are significantly few compared to fossil fuel stations. In fact, the scarcity of recharging stations in and around populated areas has caused owners of electric vehicles to coin the phrase range anxiety, to connote the possibility that their driving trips may be limited in range, or that the driver of the electric vehicle will be stranded without recharging options. It is this problem of range anxiety that prevents more than electric car enthusiasts from switching to pure electric cars, and abandoning their expensive fossil fuel powered vehicles.

SUMMARY OF THE INVENTION

An exchangeable electric vehicle battery receptacle, kiosk and infrastructure are disclosed herein. Embodiments generally include an exchangeable battery kiosk with a dual locking and releasing mechanism to secure an exchangeable battery and dispense the exchangeable battery. In one embodiment, a battery-exchange kiosk is disclosed. The kiosk includes at least one receptacle slot, a bell crank and solenoid that lock an exchangeable battery in the receptacle slot, and circuitry that dispenses the battery. The receptacle slot holds the exchangeable battery, which fits at least partially within the receptacle slot. The bell crank includes a first arm extending into the receptacle slot and a second arm coupled to an extension spring that is coupled to a fixed point on the kiosk. The exchangeable battery comprises a form factor dimensioned to fit at least partially around the first arm. The solenoid has an armature and is positioned adjacent to the second arm. The armature fixes the bell crank and fixes the extension spring in an extended state, thereby locking the exchangeable battery in the receptacle slot. The circuitry retracts the armature into the solenoid. A retraction force on the second arm by the extension spring rotates the bell crank, at least partially dispensing the exchangeable battery from the receptacle slot.

In another embodiment, an exchangeable battery is described. The exchangeable battery includes first and second form factors. The first form factor is dimensioned to at least partially fit within a receptacle slot of an exchangeable battery kiosk, where the receptacle slot includes similar features to that described above with regard to the kiosk, such as the bell crank with the first and second arms, the solenoid, and the circuitry. The second form factor is dimensioned to fit at least partially around the first arm. In yet another embodiment, an exchangeable battery housing in an electric vehicle is described. The housing includes features similar to those described above with regard to the kiosk, and is disposed in the electric vehicle.

BRIEF DESCRIPTION OF THE DRAWINGS

A more particular description of the invention briefly described above is made below by reference to specific embodiments. Several embodiments are depicted in drawings included with this application, in which.

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

The descriptions of the various embodiments include, in some cases, references to elements described with regard to other embodiments. Such references are provided for convenience to the reader, and are not intended to limit the described elements to only the features described with regard to the other embodiments. Rather, each embodiment is distinct from each other embodiment.

Throughout the detailed description, various elements are described as "off-the-shelf." As used herein, "off-the-shelf" means "pre-manufactured" and/or "pre-assembled."

In some instances, features represented by numerical values, such as dimensions, quantities, and other properties that can be represented numerically, are stated as approximations. Unless otherwise stated, an approximate value means "correct to within 50% of the stated value." Thus, a length of approximately 1 inch should be read "1 inch+/−0.5 inch." Similarly, other values not presented as approximations have tolerances around the stated values understood by those skilled in the art. For example, a range of 1-10 should be read "1 to 10 with standard tolerances below 1 and above 10 known and/or understood in the art."

Figure 1:
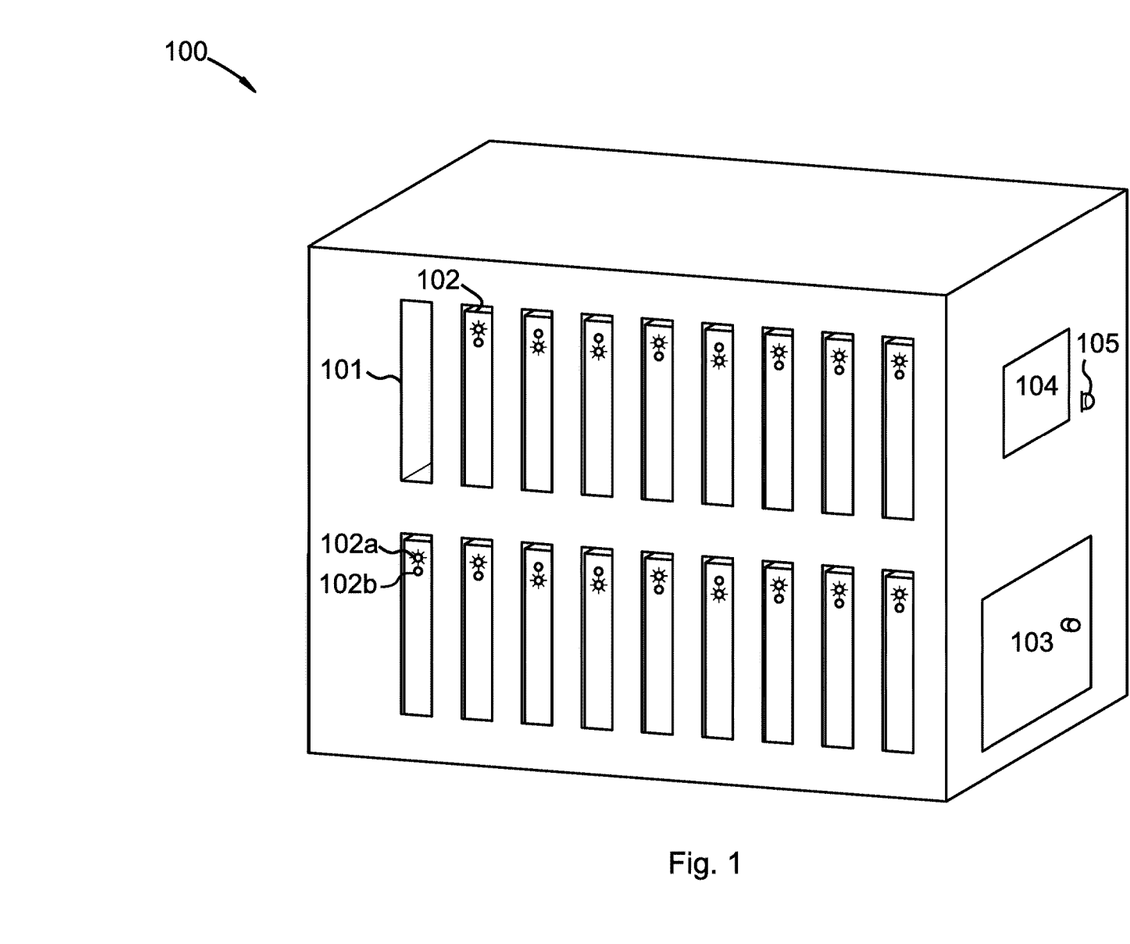
FIG. 1 depicts one embodiment of an exchangeable battery kiosk according to the claimed invention.

FIG. 1 depicts one embodiment of an exchangeable battery kiosk according to the claimed invention. Kiosk 100 includes receptacle slot 101, exchangeable battery 102, maintenance panel 103, user interface 104, and assist button 105.

As depicted, each battery 102 includes charging indicator 102a and charged indicator 102b. Charging indicator 102a indicates that battery 102 is currently charging and is not available for exchange. Charged indicator 102b indicates that battery 102 is fully charged and is available for exchange. Maintenance panel 103 allows access to internal circuitry and controllers of kiosk 100. In some embodiments, kiosk 100 includes processors, memory, and one or more network connectors, such as a CAT-5 network port or a wireless transceiver. In such embodiments, kiosk 100 communicates with a remote server information about the kiosk, such as identification of batteries exchanged, unauthorized access attempts, and/or battery and/or charging functioning. The circuitry, memory, and/or processors additionally control receiving and dispensing of batteries 102.

In some embodiments, the circuitry, memory, and processors are implemented as a computer internal to kiosk 100. The computer, in some such embodiments, associates a battery ID of a returned battery with a user enrolled in a battery exchange co-op. The computer dissociates the user from the returned battery and associates the user with a fully charged battery dispensed to the user. In some further embodiments, the computer communicates the association between the fully charged battery, with a corresponding battery ID, and the user, to a remote server.

Kiosk 100 is part of an exchangeable battery co-op, described further below with regard to FIG. 7. As depicted, kiosk 100 includes a plurality of receptacle slots 101 and a plurality of exchangeable batteries 102. In some embodiments, one of the plurality of receptacle slots 101 is maintained as empty to receive a depleted exchangeable battery 102 from a user. Each of the other of the plurality of receptacle slots 101 holds an exchangeable battery. Kiosk 100 maintains the one empty receptacle slot 101 by dispensing a fully charged battery 102 to the user upon receiving the depleted battery 102.

Figure 2:
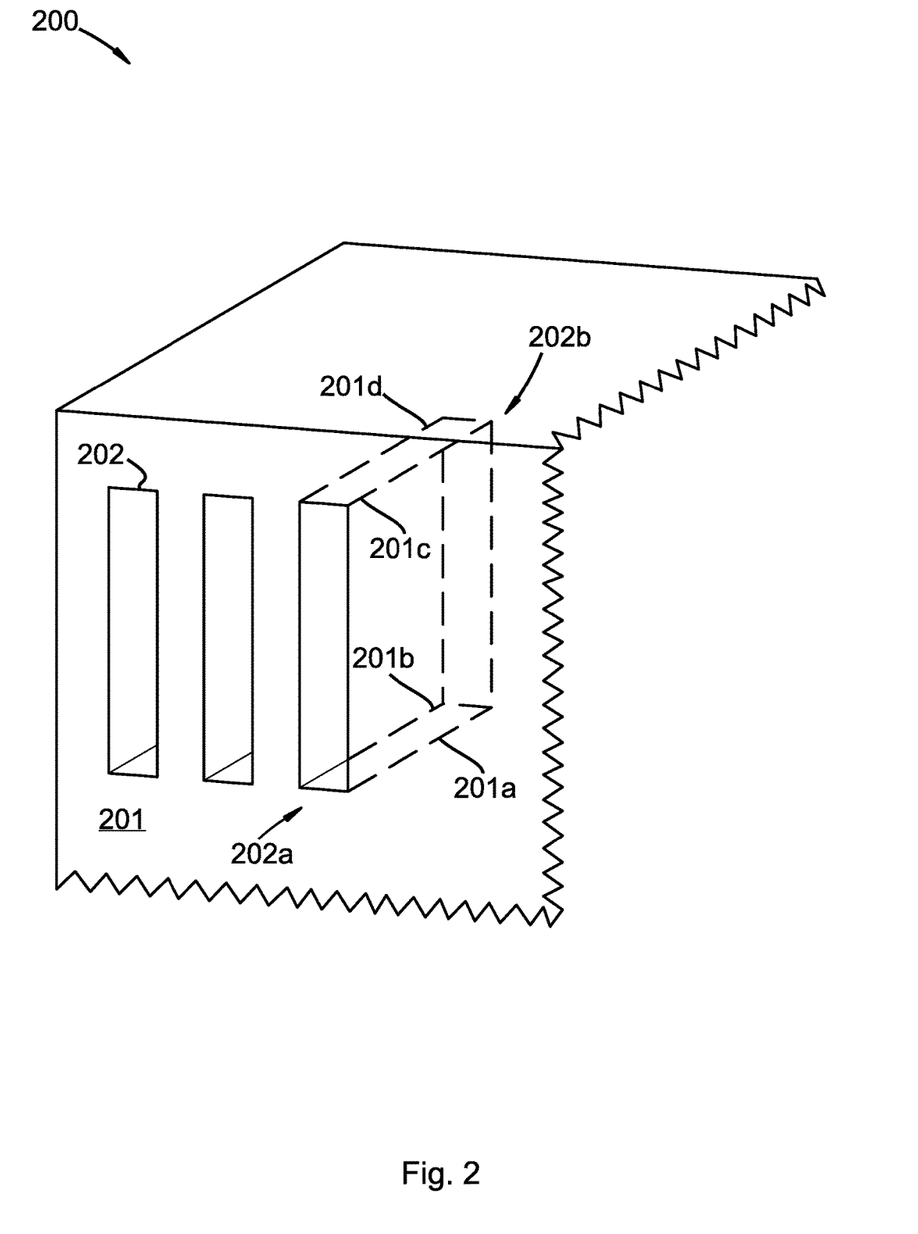
FIG. 2 depicts a receptacle slot in an exchangeable battery kiosk according to the claimed invention.

FIG. 2 depicts a receptacle slot in an exchangeable battery kiosk according to the claimed invention. Kiosk 200 includes kiosk face 201 and receptacle slot 202. Receptacle slot 202 is recessed into face 201 of kiosk 200, and is defined by kiosk surfaces having edges 201a-d. As depicted, face 201 is a vertical face of kiosk 200. However, in other embodiments, face 201 is a horizontal face. In yet other embodiments, face 201 is a sloped face. Receptacle slot 202 includes open end 202a and closed end 202b. In some embodiments, open end 202a is flush with face 201. In other embodiments open end 202a is slightly recessed into face 201 and includes filleting.

Figure 3:
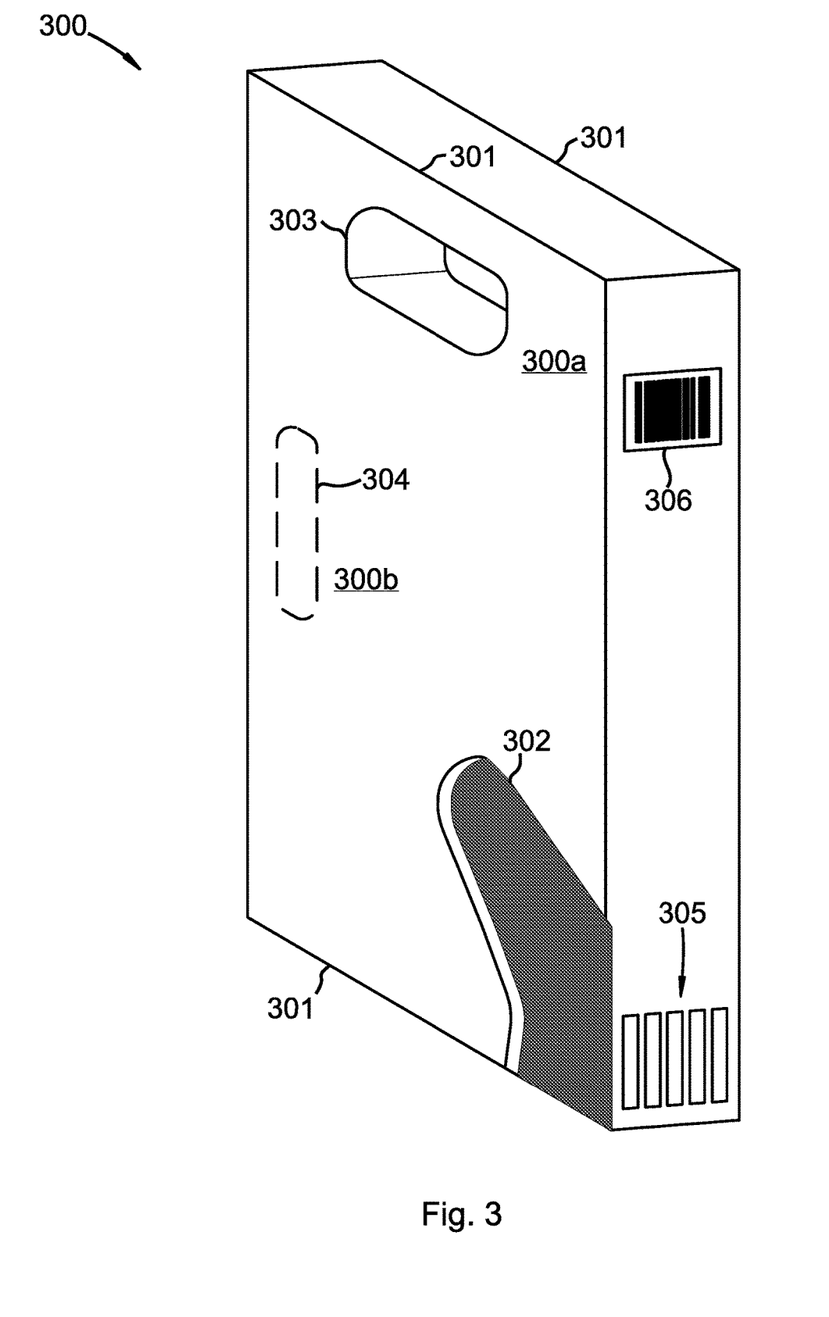
FIG. 3 depicts an exchangeable battery.
Figures 4A, 4B:
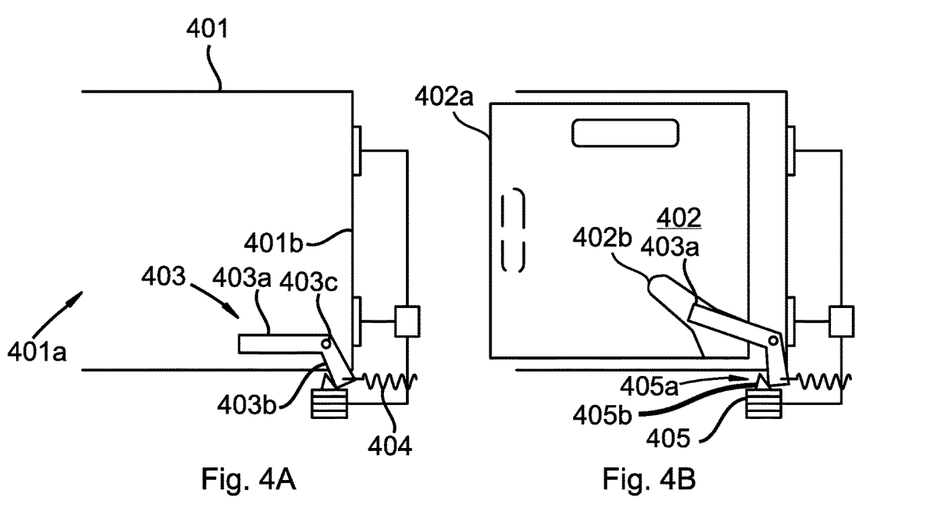
FIGS. 4A-D depict various views of an exchangeable battery and receptacle slot.
Figure 4C:
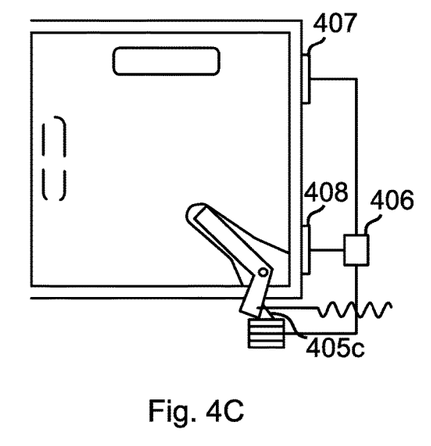
Figure 4D:
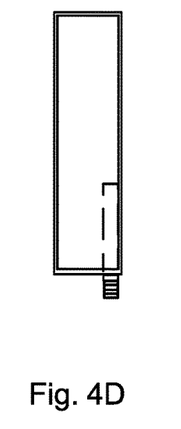

FIG. 3 depicts an exchangeable battery according to the claimed invention. Battery 300 includes first form factor 301, second form factor 302, handle 303, grip assist 304, electrical contacts 305, and identifier 306. Exchangeable battery 300 is one of a plurality of exchangeable batteries in an exchangeable battery co-op. Battery 300 is any of a variety of rechargeable batteries, such as Lithium Ion batteries. Battery 300 has, in some embodiments, a specific density ranging from 100-265 Wh/kg. In other embodiments, battery 300 has a specific density ranging up to 500 Wh/kg or 710 Wh/kg. Additionally, battery 300 weighs an amount ranging from 5 to 20 lbs. In some embodiments, battery 300 weighs an amount ranging from 8 to 12 pounds. In yet other embodiments, battery 300 weighs approximately 10 pounds.

Weight is an important factor for exchangeable batteries, because users must be able to easily lift and move the batteries. 10 pounds has been found to be an optimal weight for exchangeable car batteries, because most adults are capable of easily moving 10 pounds, which is slightly more than a gallon of milk. The energy density of the battery, and the number of batteries included in a vehicle, vary, where higher energy density and more batteries equate to greater range. It has been found that users are discouraged when exchanging batteries if the user has to exchange more than 10 batteries. Thus, an optimal exchangeable battery set for an electric vehicle includes 10 10-pound batteries.

Handle 303 is disposed on top side 300a of battery 300, and is used to assist a user in carrying battery 300 from an electric vehicle to a battery kiosk. In embodiments where receptacles for battery 300 in the kiosk are on a horizontal or sloped face of the kiosk, and where a receptacle in a battery housing of the electric vehicle is also on a horizontal or sloped face of the housing, handle 303 is easily used by a user to transfer battery 300 between the electric vehicle and the kiosk. However, in embodiments where one or both of the housing and kiosk have the receptacles on vertical faces, it is additionally beneficial to have grip assist 304. Unlike handle 301, which passes completely through battery 300 and limits space available for cells, grip assist 304 is an indentation in battery 300. Grip assist 304 aids a user in removing battery 300 from the receptacles as battery 300 is dispensed from the receptacles. For example, in one embodiment, the electric vehicle battery housing receptacle is on a horizontal face of the housing, and the kiosk receptacle is on a vertical face of the kiosk. In such an embodiment, a user uses handle 303 to lift battery 300 from the electric vehicle, and uses handle 303 and grip assist 304 to insert battery 300 into the kiosk. Similarly, when battery 300 is partially dispensed from the kiosk having vertical receptacles, grip assist 304 aids a user in removing battery 300 from the kiosk. In some embodiments, grip assist 304 is rubberized to increase a user's grip on battery 300.

FIGS. 4A-D depict various views of an exchangeable battery and receptacle slot according to the claimed invention. Receptacle slot 401 holds exchangeable battery 402. Receptacle slot 401 includes open end 401a and closed end 401b. Battery 402 includes first form factor 402a, which is dimensioned to at least partially fit within receptacle slot 401. Receptacle 401 further includes bell crank 403, which has first arm 403a extending into receptacle 401 and second arm 403b coupled to extension spring 404. Extension spring 404 is additionally coupled to a fixed point on a battery kiosk or electric vehicle housing. Battery 402 includes second form factor 402b, which is dimensioned to fit at least partially around first arm 403a. Inserting battery 402 into receptacle 401 such that first arm 403a fits into second from factor 402b causes bell crank 403 to rotate around pivot point 403c. Solenoid 405 includes armature 405a extended outwards from solenoid 405 by a compression spring. Armature 405a has locking side 405b and pressing side 405c. Solenoid 405 is positioned adjacent to second arm 403b such that rotation of bell crank 403 caused by insertion of battery 402 into receptacle 401 causes second arm 403b to slide across pressing side 405c, pressing armature 405a into solenoid 405 and compressing the compression spring. Further insertion of battery 402 causes second arm 403b to slide past armature 405a. The compression spring forces armature 405a out of solenoid 405, and a retracting force of extension spring 404 on second arm 403b forces second arm 403b against locking side 405b of armature 405a. In this way, solenoid 405 and bell crank 403 lock battery 402 in receptacle 401. In some embodiments, one or more of bell crank 503 and armature 405a are comprised of steel to ensure security of battery 402 in receptacle 401.

As described above, when a user inserts a depleted battery into a co-op kiosk, the kiosk dispenses a charged battery to the user. To dispense the battery, the kiosk further includes circuitry 406, which communicates with battery ID reader 407, electrical contacts 408, and solenoid 405. Upon insertion of the depleted battery, circuitry 406 recognizes that electricity of flowing to the depleted battery, charging the battery. Upon recognizing a depleted battery has been inserted, circuitry 406 identifies a solenoid associated with a receptacle holding a fully charged battery. Circuitry 406 activates solenoid 405, retracting armature 405a into solenoid 405. The retraction force on second arm 403b by extension spring 404 rotates bell crank 403 about pivot point 403c, forcing first arm 403a against wall 402c of second form factor 402b and sliding fully charged battery 402 at least partially out of receptacle 401.

Battery ID reader 407 reads a battery ID (such as ID 306 in FIG. 3) of battery 402. In some embodiments, battery ID reader 407 identifies battery 402 upon receiving a notification that batter 402 is locked into receptacle 401. This prevents circuitry 406 from triggering the release of a fully charged battery before the depleted battery has been fully secured. Otherwise, in some cases, a user inserts a depleted battery only partially but retains the depleted battery and the charged battery.

Figure 5A:
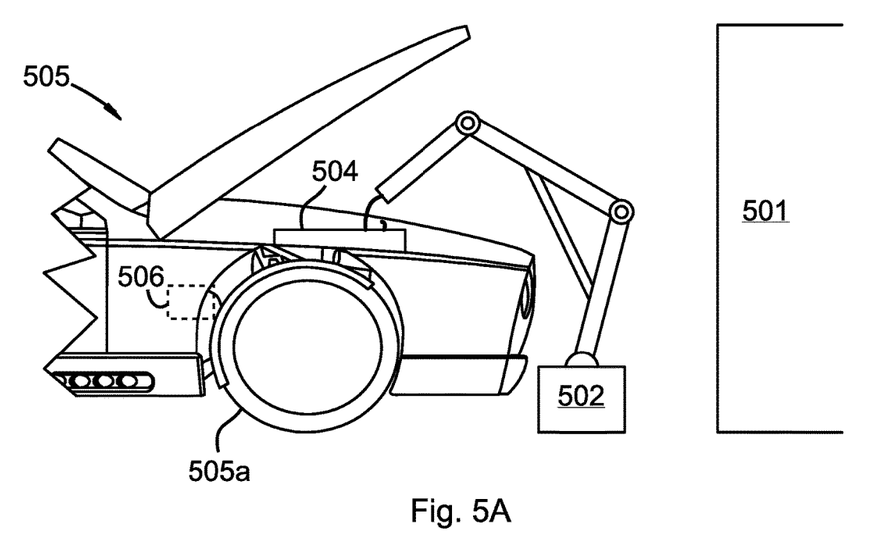
FIGS. 5A-B depict a lift assist arm and exchangeable battery housing in an electric vehicle.
Figure 5B:
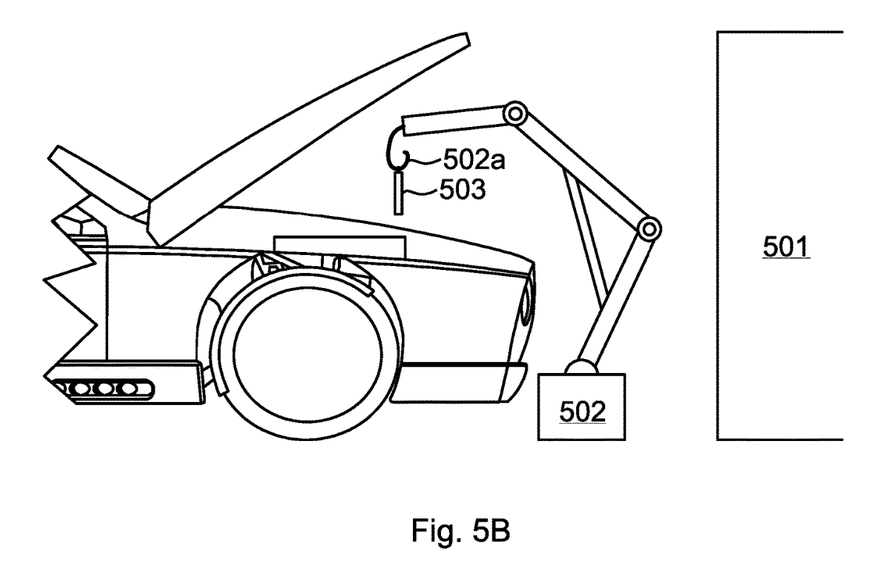

FIGS. 5A-B depict a lift assist arm and exchangeable battery housing in an electric vehicle. As described above with regard to FIG. 3, battery weight can be a limiting factor for a battery exchange co-op. In some embodiments, therefore, kiosk 501 includes lift assist arm 502. Lift assist arm couples to battery 503 and assists a user in moving the battery. For example, in one embodiment, lift assist arm includes hook 502a that loops through a handle of battery 503.

In some electric vehicle embodiments, it is beneficial to distribute weight forward of the front tires. Thus, as depicted in FIGS. 5A-B, battery housing 504 of electric vehicle 505 is disposed at least partially forward of front tires 505a of electric vehicle 505. Housing 504 includes at least one receptacle slot, such as those described above with regard to FIGS. 1-2 and 4, that holds battery 503. In some such embodiments including housing 504 forward of front tires 505a, it is necessary to position electric motor 506 behind front tires 505a to accommodate housing 504.

Figure 6:
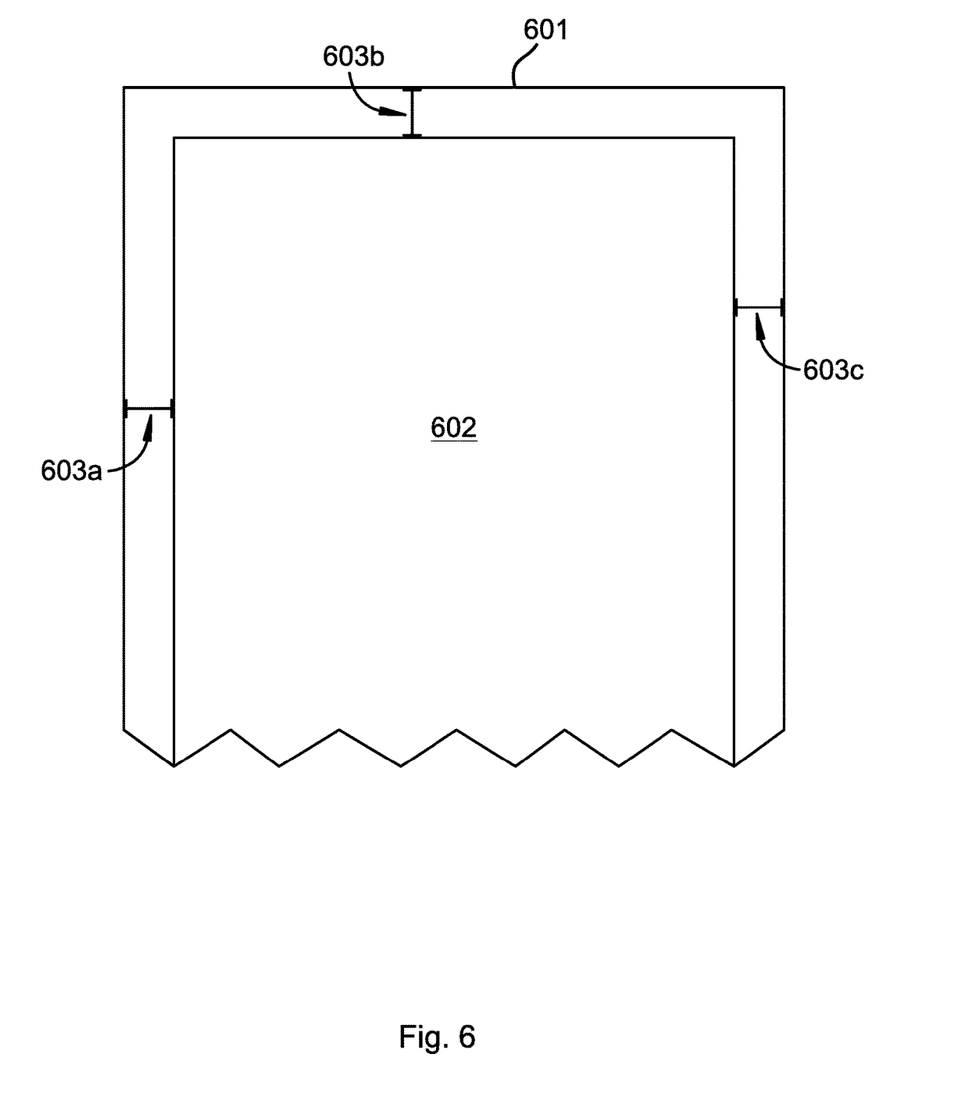
FIG. 6 depicts an anti-theft design of an exchangeable battery receptacle slot.

FIG. 6 depicts an anti-theft design of an exchangeable battery receptacle slot. Receptacle slot 601 includes dimensions slightly larger than battery 602. In order for battery 602 to be inserted into receptacle 601, spaces 603a-c must be present; otherwise, it will be too difficult to insert battery 602 into receptacle 601. Spaces 603a-c range in size from fractionally larger than 0 mm each to 3 mm each. The sum of spaces 603a-c along any single axis is referred to herein as tolerance. In the depicted embodiment, battery 602 dimensions are within a tolerance of one or more receptacle 601 dimensions.

One particular problem facing electric vehicle battery exchange systems is that electric vehicle batteries are expensive, and thus prime targets for theft. This is balanced against the need for simple, easily-maintained systems. Locking the batteries in an enclosed kiosk and dispensing them from the enclosed kiosk adds complexity and thus increases the need for maintenance and the potential for failures. The receptacle described above addresses this issue by using inexpensive parts that are easy to maintain and replace. However, having an open-air kiosk presents the potential for theft. One way to thwart potential theft is to have close tolerances of dimensions between the battery and the receptacle so that a thief cannot insert prying devices. However, this is balanced against the ease of inserting the battery into the receptacle; the closer the tolerances, the more precise a user has to be in inserting the battery. This can be particularly difficult with heavy batteries. An optimal tolerance that allows for simple inserting but thwarts theft ranges from more than 0 mm to 5 mm, and depends, in some embodiments, on environmental factors such as temperature fluxuations. In one embodiment, an optimal tolerance is 1 mm.

Figure 7:
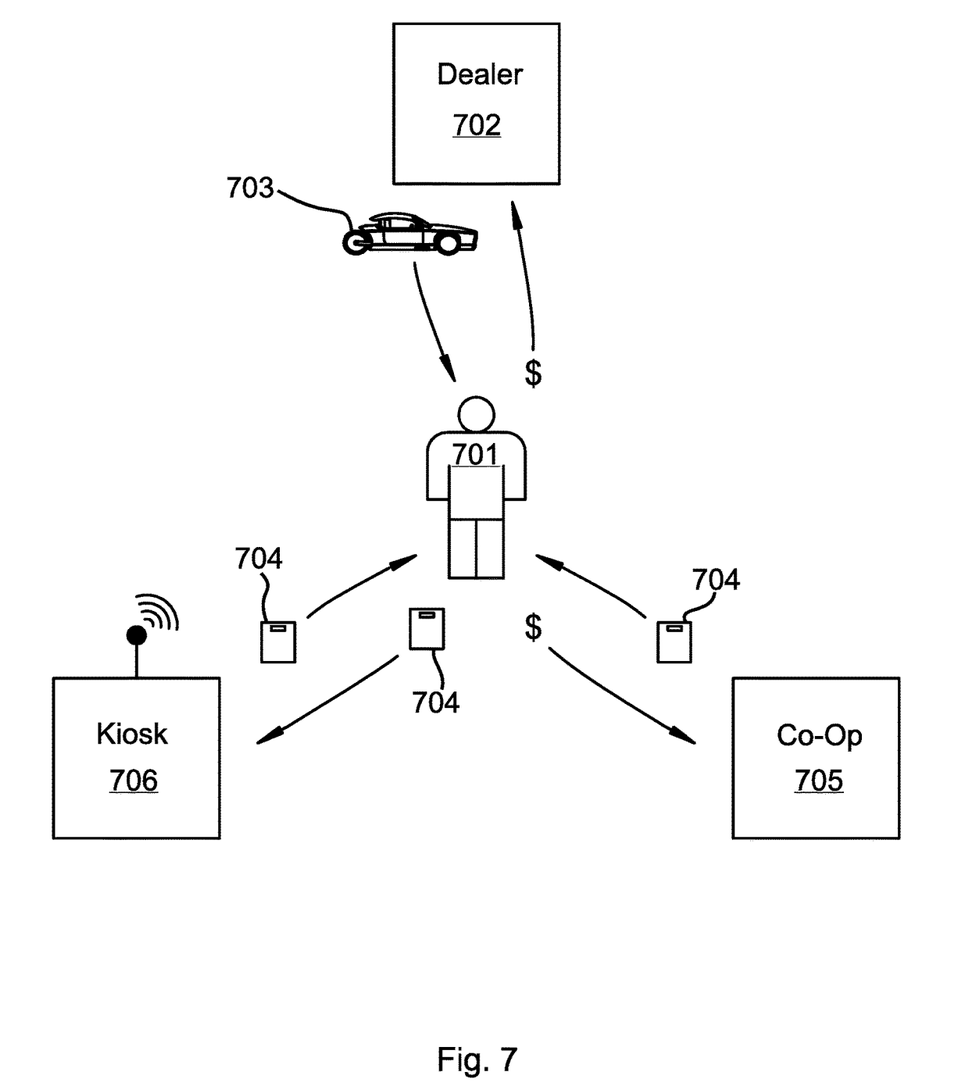
FIG. 7 depicts an embodiment of an exchangeable electric vehicle battery co-op.

FIG. 7 depicts an embodiment of an exchangeable electric vehicle battery co-op. User 701 purchases electric vehicle 702 from dealer 703. Additionally, user 701 purchases batteries 704 from co-op 705, thereby joining co-op 705. A new and unused set of batteries 704 is introduced to co-op 705 as new user 701 joins co-op 705. In some embodiments, membership in co-op 705 requires a monthly or annual fee. In other embodiments, membership in co-op 705 requires a periodic fee in addition to a use fee. In one alternative embodiment, user 701 purchases electric vehicle 703, which comes with batteries 704. Co-op 705 purchases user's 701 batteries by granting user 701 free membership and/or an amount of free use of co-op batteries. Once user 701 is a member of co-op 705, user 701 can exchange batteries 704 at any co-op kiosk 706.

The invention claimed is:

1. A battery kiosk, comprising:
   at least one receptacle slot that holds an exchangeable battery, adapted to receive an arm of a bell crank that fits at least partially within the receptacle slot;
   the bell crank comprising a first arm extending into the receptacle slot and a second arm coupled to an extension spring that is coupled to a fixed point on the kiosk, wherein the exchangeable battery comprises a form factor dimensioned to fit at least partially around the first arm;
   a solenoid having an armature, wherein the solenoid is positioned adjacent to the second arm, and wherein the armature fixes the bell crank and fixes the extension spring in an extended state, thereby locking the exchangeable battery in the receptacle slot; and
   circuitry that retracts the armature into the solenoid, wherein a retraction force on the second arm by the extension spring rotates the bell crank, at least partially dispensing the exchangeable battery from the receptacle slot.

2. The kiosk of claim 1, further comprising a lift assist that couples to the exchangeable battery and assists a user in moving the exchangeable battery.

3. The kiosk of claim 1, wherein one or more exchangeable battery dimensions are within a tolerance of one or more corresponding receptacle slot dimensions, wherein the tolerance ranges from more than 0 mm to 5 mm.

4. The kiosk of claim 1, further comprising a battery ID reader that reads a battery ID of the exchangeable battery.

5. The kiosk of claim 4, wherein the battery ID reader identifies the exchangeable battery upon receiving a notification the exchangeable battery is locked into the receptacle slot.

6. The kiosk of claim 4, further comprising a computer, wherein a battery ID of a returned battery is associated with a user, and wherein the computer disassociates the user from the returned battery and associates the user with a fully charged battery dispensed to the user.

7. The kiosk of claim 6, wherein the computer communicates the association of the fully charged battery and user with a remote server.

8. The kiosk of claim 1, comprising a plurality of receptacle slots, wherein one of the plurality of receptacle slots is maintained as empty to receive the depleted battery from a user, wherein each of the other of the plurality of receptacle slots holds an exchangeable battery, and wherein the kiosk maintains the one empty receptacle slot by dispensing the fully charged battery to the user upon receiving the depleted battery.

9. The kiosk of claim 1, wherein one or more of the bell crank and the armature are comprised of steel.

10. The kiosk of claim 1, wherein the kiosk is part of an exchangeable batter co-op.

11. The kiosk of claim 10, wherein a new and unused set of batteries is introduced to the coop as a new user joins the co-op.

12. An exchangeable battery housing in an electric vehicle, comprising:

- at least one receptacle slot, disposed in the electric vehicle, that holds an exchangeable battery adapted to receive an arm of a bell crank that fits at least partially within the receptacle slot;
- the bell crank comprising a first arm extending into the receptacle slot and a second arm coupled to an extension spring that is coupled to a fixed point on the kiosk, wherein the exchangeable battery comprises a form factor dimensioned to fit at least partially around the first arm;
- a solenoid having an armature, wherein the solenoid is positioned adjacent to the second arm, and wherein the armature fixes the bell crank and fixes the extension spring in an extended state, thereby locking the exchangeable battery in the receptacle slot; and
- circuitry that retracts the armature into the solenoid, wherein a retraction force on the second arm by the extension spring rotates the bell crank, at least partially dispensing the exchangeable battery from the receptacle slot.

13. The housing of claim 12, wherein the housing is disposed at least partially forward of front tires of the electric vehicle.

14. The housing of claim 12, wherein the exchangeable battery is one of a plurality of exchangeable batteries in an exchangeable battery co-op.

* * * * *